3,486,063
INCANDESCENT LAMP
Samuel Ruben, 52 Seacord Road,
New Rochelle, N.Y. 10804
Filed June 6, 1967, Ser. No. 643,948
Int. Cl. H01k 1/50
U.S. Cl. 313—222             1 Claim

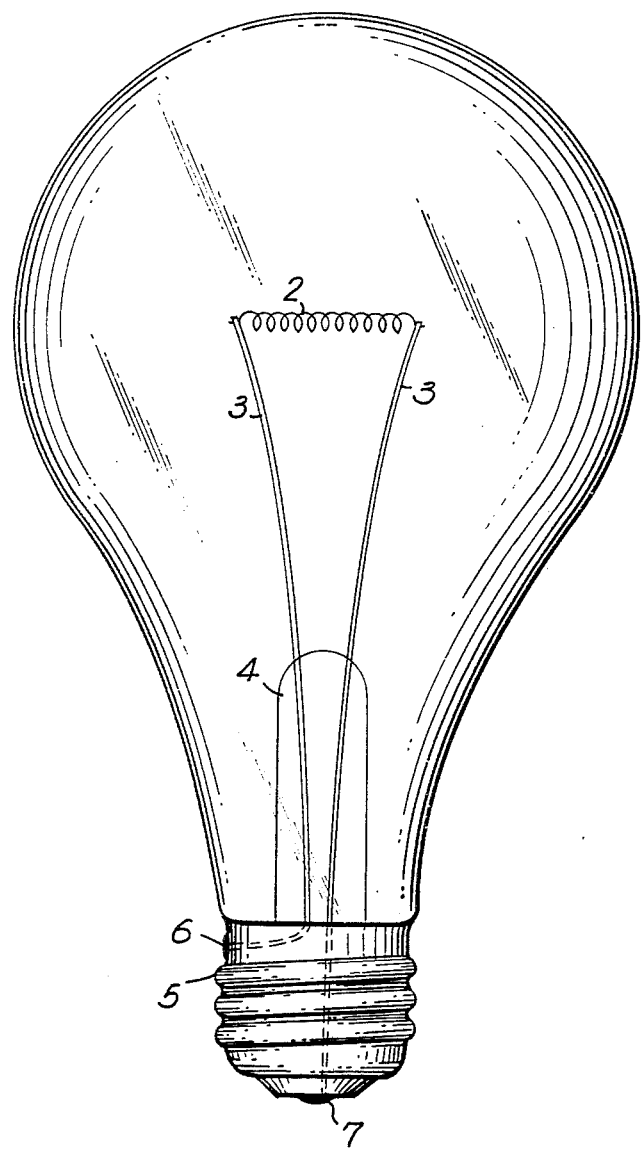

ABSTRACT OF THE DISCLOSURE

This invention is an incandescent lamp having a filament of solid titanium nitride housed in a sealed bulb in an atmosphere of nitrogen.

---

This invention relates to an incandescent electric lamp utilizing as its incandescent source a filament of titanium nitride.

An object of the invention is to provide an improved incandescent lamp in which minimum darkening of the bulb results from evaporation of a metal vapor.

Other objects will be apparent as the disclosure proceeds and from the drawing which illustrates the invention.

Titanium nitride has a melting point of 2950° C. and I have found that in a nitrogen atmosphere, it is capable of operation at high temperatures without decomposition or evaporation. Titanium will combine with nitrogen to form a conductive nitride at 800° C. To produce an incandescent lamp a coiled filament of titanium is heated in a nitrogen atmosphere at 1200° C. and converted to titanium nitride. The filament is then mounted on two leads, the ends being connected with the bulb screw base contacts and it is enclosed in a glass bulb which, after evacuation, is filled with nitrogen gas. While I prefer pure nitrogen, the gas may also be a mixture of nitrogen and argon for reduction of gaseous heat conductivity. The pressure may be below atmospheric pressure to compensate for temperature effects.

The drawing illustrates essentials of an incandescent lamp in which solid titanium nitride filament 2 is made by reacting coiled titanium with nitrogen at a temperature above 800° C. until the titanium is completely converted. The ends of the filament are connected to nickel wire supports 3 which are welded to Dumet wires extending through the base to terminals 6 and 7. For some sizes the titanium may be directly reacted in the bulb to prenitride the filaments before mounting. After evacuation, the bulb is filled with nitrogen at a pressure determined by the energy expended in the bulb so that at operating temperatures it is not much above atmospheric pressure.

I claim:

1. An incandescent lamp in which the incandescible filament is solid titanium nitride, a sealed glass bulb in which said filament is housed, said bulb having an atmosphere of nitrogen to maintain said filament as titanium nitride.

References Cited

UNITED STATES PATENTS

| | | | |
|---|---|---|---|
| 1,180,159 | 4/1916 | Langmuir | 313—185 |
| 1,925,857 | 9/1933 | Van Liempt | 313—222 X |
| 2,170,683 | 8/1939 | Friederich et al. | 313—222 X |
| 3,277,330 | 10/1966 | Cooper | 313—223 X |

FOREIGN PATENTS

| | | |
|---|---|---|
| 641,768 | 2/1937 | Germany. |

JAMES W. LAWRENCE, Primary Examiner

PALMER C. DEMEO, Assistant Examiner

U.S. Cl. X.R.

313—223